(12) United States Patent
Zeng et al.

(10) Patent No.: US 7,644,505 B2
(45) Date of Patent: Jan. 12, 2010

(54) LEVELLING ROD, LEVEL DETERMINING APPARATUS FOR SAID ROD, AND LEVEL DETERMINING METHOD

(75) Inventors: Zheng Dong Zeng, Singapore (SG); Charles Leopold Elisabeth Dumoulin, Singapore (SG); Chin Keong Ng, Singapore (SG); Keliang Zhou, Huangshi (CN)

(73) Assignee: Leica Geosystems AG, Heerbrugg (CH)

( * ) Notice: Subject to any disclaimer, the term of this patent is extended or adjusted under 35 U.S.C. 154(b) by 223 days.

(21) Appl. No.: 11/568,530

(22) PCT Filed: Apr. 29, 2005

(86) PCT No.: PCT/EP2005/004619

§ 371 (c)(1),
(2), (4) Date: Dec. 20, 2006

(87) PCT Pub. No.: WO2005/108922

PCT Pub. Date: Nov. 17, 2005

(65) Prior Publication Data

US 2007/0289152 A1   Dec. 20, 2007

(30) Foreign Application Priority Data

May 6, 2004   (EP) .................................. 04010761

(51) Int. Cl.
   *G01C 15/06*   (2006.01)
(52) U.S. Cl. ............................ 33/293; 33/707; 356/4.08
(58) Field of Classification Search .......... 33/293–296, 33/706–707; 356/4.08, 373, 375, 383
   See application file for complete search history.

(56) References Cited

U.S. PATENT DOCUMENTS

| | | | | |
|---|---|---|---|---|
| 4,715,714 A | * | 12/1987 | Gaechter et al. | 356/617 |
| 5,539,993 A | * | 7/1996 | Kilpinen et al. | 33/706 |
| 5,572,009 A | * | 11/1996 | Guertler | 235/494 |
| 5,742,378 A | * | 4/1998 | Kumagai et al. | 33/293 |
| 5,887,354 A | * | 3/1999 | Nagao | 33/293 |
| 6,108,920 A | * | 8/2000 | Kinoshita | 33/293 |
| 6,167,629 B1 | | 1/2001 | Chiba | |

(Continued)

FOREIGN PATENT DOCUMENTS

DE    198 26 873 C    11/1999

(Continued)

*Primary Examiner*—Yaritza Guadalupe-McCall
(74) *Attorney, Agent, or Firm*—Workman Nydegger

(57) ABSTRACT

The levelling rod (1) for a level determining apparatus (2) has position indications therealong along expressed by barcode symbols (11, 12). At least some of said barcode symbols are color barcode symbols, the color serving to encode said position indications. The barcode symbols can be organised in first and second blocks (12, 11) of barcode symbols, each providing a position indication, wherein the length (Ls) occupied along the rod (1) by a first block (12) is smaller than the length (Lb) occupied along the rod by a second block (11), the first blocks thereby providing a finer position indication than the second blocks. The first blocks (12) of barcode symbols can be formed of monochrome and color bar code symbols, e.g. just one color barcode symbol and at least one monochrome barcode symbol, while the second blocks (11) can be formed purely of color barcode symbols. The invention also relates to a level determining apparatus specifically adapted for the above rod, and to a method of using that rod.

36 Claims, 3 Drawing Sheets

U.S. PATENT DOCUMENTS

| | | | |
|---|---|---|---|
| 7,185,816 B1* | 3/2007 | Shoobridge | 235/462.04 |
| 7,229,025 B2* | 6/2007 | Sussmeier et al. | 235/494 |
| 7,373,725 B1* | 5/2008 | Vanneman et al. | 33/293 |
| 7,401,738 B2* | 7/2008 | Hosoi et al. | 235/454 |
| 7,506,452 B1* | 3/2009 | Vanneman et al. | 33/293 |
| 2002/0073562 A1* | 6/2002 | Brink | 33/293 |
| 2005/0011955 A1* | 1/2005 | Saito | 235/462.04 |
| 2005/0284944 A1* | 12/2005 | Ming | 235/494 |
| 2007/0017111 A1* | 1/2007 | Hoback et al. | 33/771 |
| 2007/0125861 A1* | 6/2007 | Shoobridge | 235/462.04 |
| 2007/0289152 A1* | 12/2007 | Zeng et al. | 33/293 |
| 2008/0210764 A1* | 9/2008 | Ming | 235/494 |
| 2008/0256812 A1* | 10/2008 | Yandrick et al. | 33/294 |

FOREIGN PATENT DOCUMENTS

| | | |
|---|---|---|
| EP | 0 560 520 A | 9/1993 |
| WO | WO 9845799 A1 * | 10/1998 |

\* cited by examiner

LEVELLING ROD, LEVEL DETERMINING APPARATUS FOR SAID ROD, AND LEVEL DETERMINING METHOD

FIELD OF THE INVENTION

The present invention relates to a geodetic electronic levelling instrument for plane surveying, applications. More particularly, the invention relates to a levelling rod (also known as a levelling staff) for automatically determining a collimated position used in combination with an electronic level. The levelling rod contains blocks of coded symbols arrayed in the longitudinal direction, each indicating a height at determined intervals.

BACKGROUND ART

Various approaches have already been proposed to eliminate human operator reading errors and speed up the measurement process, and attempts have been made to develop machine-readable barcodes in different ways.

For instance, patent document U.S. Pat. No. 5,572,009 discloses a method of encoding a barcode in which a BP type of Code is formed from a P code with a given length, and whose half-bits and whole bits are alternately provided with light and dark symbols.

Patent document U.S. Pat. No. 5,742,378 discloses a barcode levelling rod having an alignment of the first and second (and third) scale dark symbols, the alignment being made in order cyclically at a constant pitch along the length of the staff. The first and second symbols have their widths made variable in different cyclic periods, and the third symbol has a constant width.

Patent documents U.S. Pat. No. 6,167,629 and U.S. Pat. No. 5,887,354 disclose levelling rods for electronic levelling, having a plurality of bar-shaped marks disposed adjacent to each other in a longitudinal direction along the levelling rod.

For all the above-mentioned levelling barcode rods, in near distance measurement, the position of the collimated barcode portion can be estimated by detecting the width dimension of the bar symbols. The width dimension of the bar symbols in the longitudinal direction of the rod is represented by a plurality of integers. If the distance between the levelling rod and the electronic level becomes large, the image of each bar symbol on the image receiver becomes small. As a result, it is difficult to discriminate accurate dimensions of the bar symbols. To this end, one plurality of barcodes disclosed in U.S. Pat. No. 5,572,009, U.S. Pat. No. 6,167,629 and U.S. Pat. No. 5,887,354 should be interpreted as two permutations of integers for near and remote distances. In these cases, the estimation of the position of the collimated portion is very coarse. It still requires a considerable amount of cross-correlation computation in a large size domain to determine the accurate position. For U.S. Pat. No. 5,742,378, FFT (Fast Fourier Transform) is used to calculate the distance between the rod and the electronic level in the remote distance measurement. Also, the height of the collimated portion is estimated by the detection of the phase angle of two periodic bar symbols. To obtain the accurate position, cross-correlation computation calculation is needed too.

Current barcodes for electronic levelling are monochrome. In the above-mentioned barcodes, the height readings are encoded by the dimension of the bars or spaces between the bars. Therefore, with current monochrome barcode scales, there are disadvantages in that it is very difficult to estimate the position (height and distance) of the collimated portion on the levelling rod with a simple decoding algorithm and a small number of calculation steps.

SUMMARY OF THE INVENTION WITH OBJECTS

According to a first aspect, the invention provides a levelling rod for a level determining apparatus, the rod having position indications therealong along expressed by barcode symbols, characterized in that at least some of the barcode symbols are colour barcode symbols, the colour serving to encode the position indications.

In the preferred embodiment, the barcode symbols are organized in first and second blocks of barcode symbols, each providing a position indication; the length occupied along the rod by a first block is smaller than the length occupied along the rod by a second block, the first blocks thereby providing a finer position indication than the second blocks.

The first blocks of barcode symbols can be formed of monochrome and colour bar code symbols.

The first blocks can comprise just one colour barcode symbol and at least one monochrome barcode symbol.

The second blocks can be formed purely of colour barcode symbols.

The colour barcode symbols forming the second blocks can be colour barcode symbols which also serve to form the first blocks.

A second block can be formed by one colour barcode symbol from of each of a plurality of first blocks.

The colour barcode symbols can have a plurality of width values, and the second blocks can be formed only of colour barcode symbols having a relatively large width value.

In the preferred embodiment, any three consecutive colour barcode symbols having the relatively large width value constitute a second block.

The colour barcode symbols can have two possible width values.

The pitch between consecutive the first blocks can be constant.

Each second block can be comprised of just three colour barcode symbols.

Each second block preferably has a unique colour sequence or permutation of colour barcode symbols.

Adjacent the barcode symbols can be separated by a selected pitch value from a set of four different fixed pitch values.

Any four adjacent barcode symbols can constitute a first block, the barcode symbols then forming an uninterrupted sequence of barcode symbols along the levelling rod.

A first block can be comprised of three monochrome barcode symbols and one colour barcode symbol.

The width dimensions of the monochrome barcode symbols can be chosen from a predetermined set of width values $\{w_x \mid \text{subscript } x=1,2,3,4 \ldots\}$.

Each first block can have a unique sequence of barcode symbols in terms of colour, width and pitch between adjacent barcode symbols.

Each first block and/or second block preferably defines a unique pattern with respect to a block at any other portion of the levelling rod or an inversion thereof, thereby providing an indication, detectable by the level determining apparatus, of whether the rod is normally positioned or positioned with a top-down inversion.

Advantageously, the colours of the colour barcode symbols are selected from the subtractive colour set: Magenta, Cyan, Yellow, or the colour set Red, Green, Blue, to enable the maximum degree of colour recognition.

Barcode symbols can be differentiated from each other by their colours and/or widths, and barcode blocks can be differentiated from each other by their permutation of the colours of their bar symbols, the permutation of the width of bar symbols and the sequence of the pitches between their bar symbols.

The length of each first block is preferably a constant value, and the length of each second block is preferably of a larger constant value.

The pitches between the colour barcode symbols of the second block can be chosen from a set of integral multiples of the length of the first block, such that by virtue of the overlapping modulations of the pitches, the frequency lines appearing in a Fourier analysis of the combined pitches are enhanced.

The colour barcode symbol comprised in a first block can further provide and indication of the "begin" and the "end" of that block.

The first blocks are preferably dimensioned so as to be discriminated by a level determining apparatus located within and up to a predetermined distance, and the second blocks are preferably dimensioned so as to be discriminated by a the level determining apparatus located beyond the predetermined distance.

According to a second aspect, the invention relates to the us of the levelling rod according to the first aspect for obtaining a height information, wherein the levelling rod is positioned substantially in a vertical plane, whereby the relative positions of the bars express a height value.

According to a third aspect, the invention relates to a level determining apparatus specifically adapted for use with the levelling rod according to the first aspect, comprising:

imaging means for obtaining a colour image of a portion of the levelling rod located a distance therefrom, processing means for identifying the position of the imaged portion along the levelling rod on the basis of colour information produced by the barcode symbols.

The processing means can be operative to identify the position of the imaged portion selectively from a first block or from a second block within the imaged portion.

In a preferred embodiment:

the imaging means comprises a colour image sensor to receive the colour barcode image; and the processing means comprise:

a symbol/pattern detection portion for detecting the colours, the pitches and an array bar symbol of the levelling rod;

a memory portion for storing the sequence of colours of the bar symbols, the sequence of the widths of bar symbols and the corresponding sequence of the pitches between the bar symbols; and a computation portion for obtaining the position information of the collimated portion on the levelling rod, based on comparing a detected signal from the symbol detecting portion with the sequence of the bar symbols in the memory portion to find out a match.

The apparatus can further comprise means for operating selectively between a first mode in which the barcode information from an imaged first block is read, and a second mode in which the barcode information from an imaged second block is read, the read information being delivered as a reading; the means can then be operative to read the information in the first mode when the imaged first block is readable, and to read the information in the second mode when the imaged first block is unreadable.

The level determining apparatus can further comprise:

means for storing the actual length, along the levelling rod of a first block and/or the actual length, along the levelling rod, of a second block, means for determining the length of the image of an imaged first block and/or the length of the image of an imaged second block, means for storing the value of the focal length of the optical system used to produce the imaged first and/or second blocks, means for determining a distance of the imaged levelling rod from the level determining apparatus on the basis of the actual length value(s), the imaged lengths and the focal length.

According to a fourth aspect, the invention relates to a method of level determination specifically adapted for use with the levelling rod according to the first aspect, comprising the steps of:

obtaining a colour image of a portion of the levelling rod;

identifying the relative position of the imaged portion along the levelling rod by reading the colour information therein expressed by an imaged first block or by an imaged second block.

The method can further comprise the steps of performing the identifying step selectively in accordance with a first mode in which the barcode information from an imaged first block is read, and a second mode in which the barcode information from an imaged second block is read, the read information being delivered as a reading, and of producing the reading in the first mode when the imaged first block is readable, and of producing the reading in the second mode when the imaged first block is unreadable.

An objective of the preferred embodiment is to provide a method for using colours to encode a barcode scale for electronic levelling, so that the colour barcode scale can be used for discrimination of different measurement distances by means of a simple decoding algorithm resulting in fast measurement speed.

Another objective of the preferred embodiment is to provide a colour barcode scale for accurate electronic levelling at different measurement distances.

Yet another objective of the preferred embodiment is to provide a colour barcode that can be decoded using a simple decoding algorithm that reduces the calculation effort required.

In one embodiment, the levelling rod has blocks of colour bar symbols disposed adjacent to each other in longitudinal direction along the levelling rod, where the colour barcode scale comprises of 2 sizes of colour barcode blocks; small barcode blocks are embedded into big ones; any four adjacent bar symbols constitute a smallest barcode block, in which 3 symbols are black and one symbol is in colour; the width dimensions of the 3 black bar symbols within one smallest barcode block are varied; the width of the colour bar symbol has two values: a wide value and a narrow value; the bar symbols are alternately arranged at 4 constant pitches; each big colour barcode block comprises of 3 adjacent wide colour bar symbols, which are chosen from the colour bar symbols within the smallest barcode blocks; the colours for the colour bar symbols are chosen from a subtractive colour set (Magenta, Cyan, Yellow); within one large colour barcode block, pitches between the two wide colour symbols are varied; any one colour barcode block is different from one colour barcode block chosen from any other portion of barcode on the levelling rod; any one colour barcode block is different from one colour barcode block chosen from any other portion of barcode on the inverted levelling rod.

With colour printing and colour recognition now becoming more prevalent and inexpensive, using colour information in a barcode symbology is realistic and advantageous owing to the colour information. When used appropriately, it aids in increasing the information density of the barcode, allows for fast decoding and confers flexibility in barcode design.

In a short distance measurement, at least one barcode block is within the field of view (FOV) of the electronic level. All the symbols within the FOV can be discriminated to determine the position of the collimated portion. At more remote distances, small bar symbols can no longer be resolved in a definite manner owing to the small pitches between the black bars and limited resolution of electronic level. Conversely, for a longer distance, larger barcode blocks are provided with their colours and large pitches adapted for discrimination at those larger distances. The characteristics of two-size barcode blocks simplify the position discrimination at different distances. Further, the fact that any one colour barcode block is different from any colour barcode block chosen from any other portion of barcode on the erected or inverted levelling rod enables the electronic level to determine automatically whether the levelling rod is erected correctly or inverted.

In a preferred embodiment, the electronic level used in combination with the levelling rod comprises a colour symbol detection portion for detecting blocks of colour bar symbols on the levelling rod; a memory portion for storing bar block information in advance; and a computation portion for comparing the detected symbol signals on the receiver with a stock of the blocks of colour symbol in the memory, to obtain the position information.

BRIEF DESCRIPTION OF THE DRAWINGS

The invention shall be more fully understood, and its advantages shall become apparent, from reading the following detailed description of the preferred embodiments, given purely non-limiting examples with reference to the appended drawings in which.

DETAILED DESCRIPTION OF THE PREFERRED EMBODIMENTS

Figure 1:
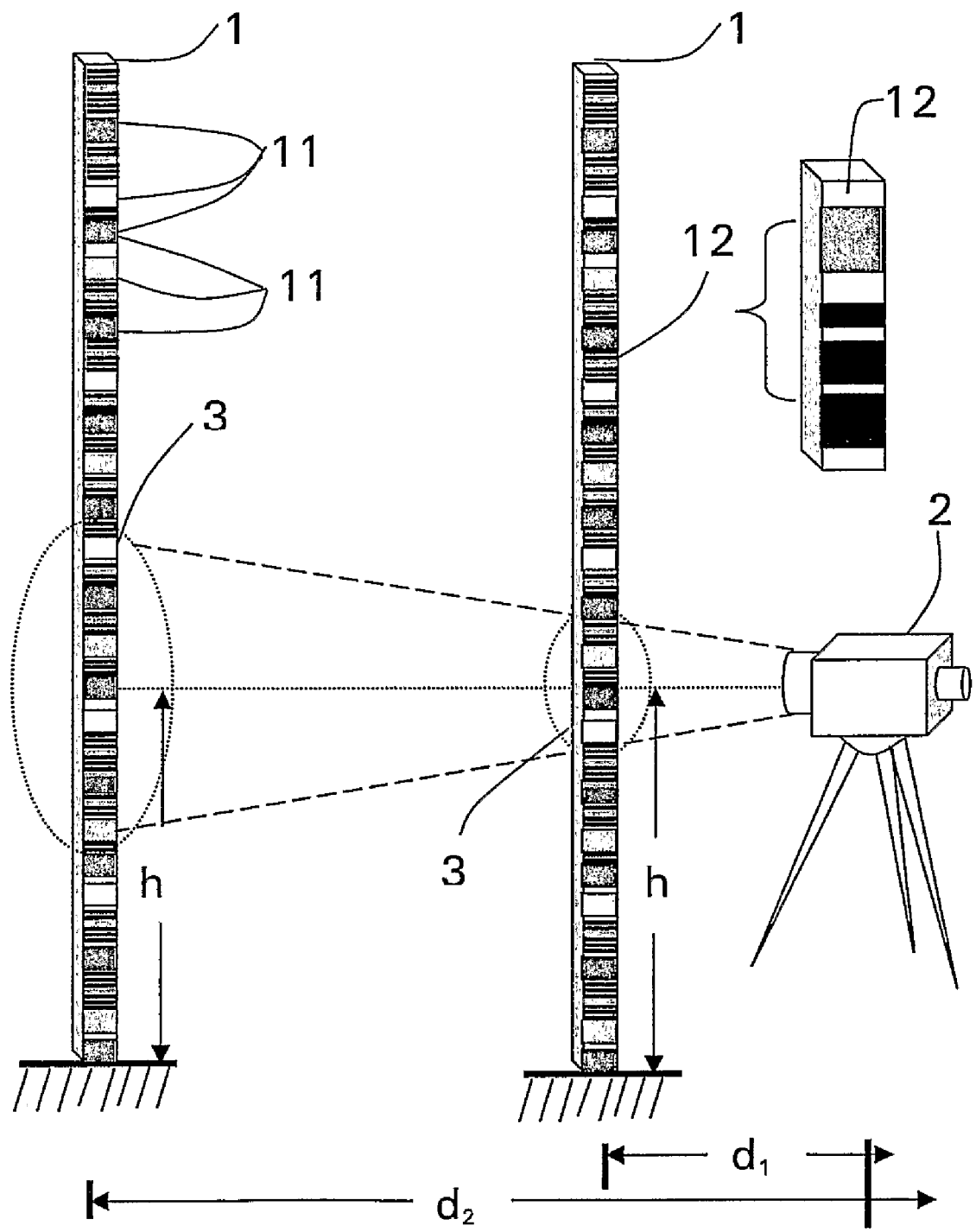
FIG. 1 is a schematic view showing an arrangement of a colour barcode levelling rod and an electronic level at different (long, short) measurement distance, according to a preferred embodiment of the invention.
Figure 2:
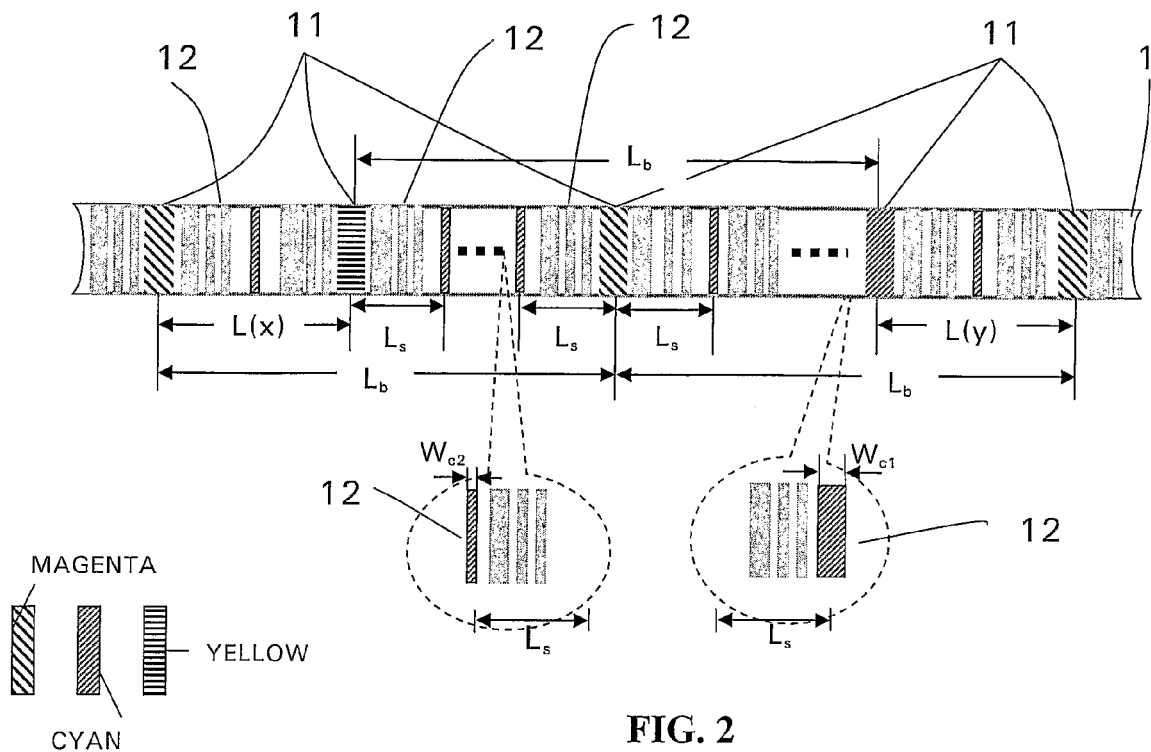
FIG. 2 is an explanatory view diagram showing one example of the constitution of colour block barcode levelling scale according to a preferred embodiment of the invention.
Figure 3:
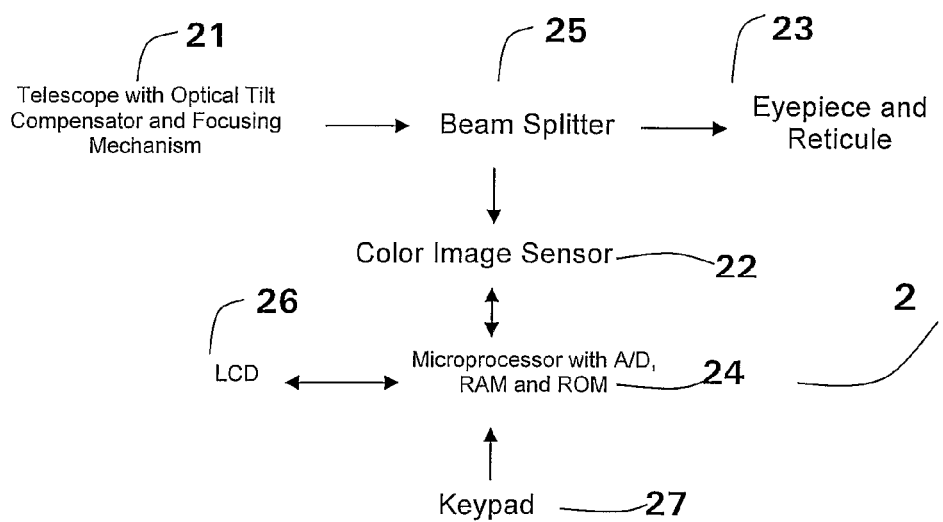
FIG. 3 is a block diagram showing a basic structure of the electronic level with colour image sensor according to a preferred embodiment of the invention.

The levelling system according to the preferred embodiment comprises a levelling rod (also referred to as a "staff") 1 and an electronic level 2 as shown in FIG. 1 through FIG. 3. In FIG. 1, reference number 1 denotes a levelling rod according to a preferred embodiment. The term "rod" generally designates any elongate physical support on which the symbols described below can be implemented. In use, the levelling rod 1 is collimated by an electronic level 2 in order to measure the height "h" of the collimated position along the rod. The rod is provided with colour barcode blocks 11 and 12 disposed along the longitudinal direction of the levelling rod. Reference numbers 11 and 12 respectively designate a relatively large colour barcode block and a relatively small colour barcode block. The term colour barcode block (or colour block) refers to a block of bar code symbols of which at least one symbol (bar) is in colour.

Height information along the rod is expressed by a block of at least two adjacent bar code symbols, hereafter referred to as a "bar block" or simply "block", the information being expressed, for a given block, by the set of data encoded by the bars, as explained below. The height information along the rod is expressed by the relative positions of the bar blocks along the length (longitudinal) direction of the rod or staff, with respect to an end portion of the latter, in a manner analogous to successive numbers marked at unit intervals on a measuring rule.

A small colour barcode block 12 comprises of 3 adjacent black bar symbols and one colour bar symbol, which are arranged at any of 4 possible different fixed (preset) pitch values. Within a small barcode block, a permutation of any 3 adjacent black bar widths, which are chosen from a predetermined set of width values, the set $\{w_x \mid \text{subscript } x=1,2,3,4\ldots\}$, can determine a specific height reading. The width dimension of the colour barcode symbol within a small barcode block has one of two possible values: a wide width value, designated "$w_{c1}$," and a narrow width value, designated "$w_{c2}$". The possible colours of the colour bar symbol are chosen from a subtractive colour set: Magenta, Cyan and Yellow for maximum separation between the hue, or from its complementary (Red, Green and Blue). The length of a small colour barcode block is a constant value "$L_s$".

A large colour barcode block 11 consists of 3 adjacent wide colour barcode symbols. The pitches "L(x)" and "$L_b$-L(x)" between two colour barcode symbols within one large colour barcode block are variable quantities. The length of a large colour barcode block is a constant value "$L_b$".

The electronic level 2 comprises of a telescope with automatic optical tilt compensator and focusing mechanism 21, colour image sensor 22, an eyepiece and reticle 23, a processing unit 24 comprising a microprocessor with A/D (analog-to-digital converter), RAM type memory and ROM type memory, a beam splitter 25, a display (liquid crystal display) 26, and a keypad 27, as shown in FIG. 3. Numeric readings are printed on the back of the levelling rod 1 in correspondence with the height indications given by the blocks, so that an operator can read the height values with his own eyes through the eyepiece and reticle 23.

As shown in FIG. 3, the electronic level 2 is provided with a telescope having an automatic optical compensator and focusing mechanism 21. A received image of the levelling rod 1 is split by a beam splitter 25 and sent to the colour image sensor 22. The colour image sensor 22 converts the optically received image of the levelling rod into a corresponding electrical signal, which it outputs into the processing unit 24. The electrical image signal is converted into a digital signal by the A/D converter and stored in the RAM. The processing unit 24 recognizes the colours of the barcode symbols. For a large colour barcode block, the processing unit 24 detects the pitches between the colour symbols, and determines the corresponding bar blocks. For a small colour barcode block, the processing unit 24 detects the width of each symbol, and determines the corresponding bar blocks. The processing unit 24 determines the height "h" of the collimated position by comparing bar blocks with table values stored beforehand in the ROM. The collimation optical system comprises the telescope with automatic optical compensator and focusing mechanism 21, beam splitter 25, eyepiece and reticle 23. The imaging optical system includes the telescope with automatic optical compensator and focusing mechanism 21, and beam splitter 25 and colour image sensor 22. The optical axis of the image optical system and the optical axis of the collimation optical system are arranged to coincide with each other, so that the collimation position on the levelling rod 1 and the collimated position in the image optical system coincide with each other.

As shown in FIG. 2, the bar symbols within a small colour barcode block 12 on the levelling rod 1 are arranged at four constant pitches. Any set of 4 adjacent bar symbols, which includes 3 black symbols and one colour symbol, constitutes a small colour bar block. The colours for the colour barcode symbols are chosen from a subtractive colour set: Magenta, Cyan, Yellow; the width dimension for a colour bar symbol has two possible values:—a large value designated $w_{c1}$ and a small value designated $w_{c2}$.

A small colour barcode block is the minimum unit for encoding height readings. The widths of the black bar symbols are chosen from a predetermined set of width values, identified by the set $\{w_x \mid \text{subscript } x=1,2,3,4 \ldots \}$. The sequence of the bar symbols is arranged such that any one permutation of 4 adjacent bar symbols selected from the colour barcode scale, is different from any permutation of 4 adjacent bar symbols extracted from any other portion of the levelling rod.

The bar symbols within a large colour barcode block 11 on the levelling rod 1 comprise 3 adjacent wide colour bar symbols. The spacings "$L(x)$" and "$L_b-L(x)$" between the wide colour bar symbols are variable. Any one colour barcode block on the levelling rod is different any other colour barcode block chosen from any other portion of the barcode scale on the erected or inverted levelling rod. Blocks of colour coded height markings are provided at unit intervals on a levelling rod to digitally indicate heights.

Figure 4:
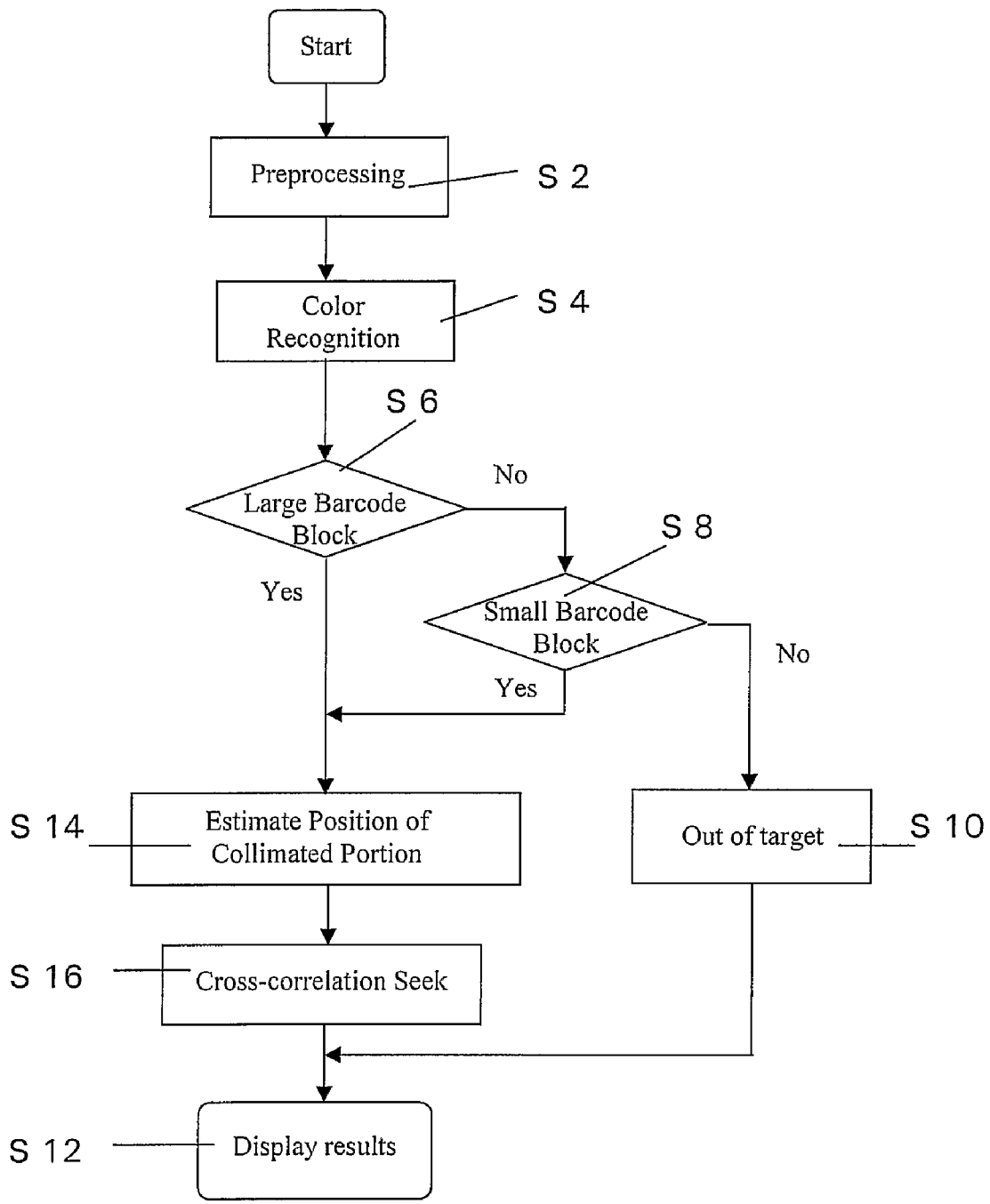
FIG. 4 is diagram showing the signal processing procedure of an electronic level for the colour barcode level rod according to a preferred embodiment of the invention.

By virtue of the introduction of two-size colour barcode blocks, decoding can be carried our simply and efficiently at different measurement distances. Decoding means are coupled to the output of the aforementioned detector for decoding the imaged coded mark to form a digital height signal. As shown in FIG. 1, at short distance "$d_1$", there are only one or several small colour barcode blocks 12 within the field of view (FOV) 3 of the electronic level 2. For small colour barcode blocks 12 within the FOV 3, the colours and widths of the bar symbols, and the pitches between bar symbols can be discriminated at the short distance "$d_1$". Then, the position of the collimated portion on the levelling rod can be determined by the discriminated small colour barcode blocks 12. Referring to FIG. 3, at a long distance "$d_2$", owing to the limited resolution of the electronic level 2, the widths of the bar symbols within the FOV 3, and even the colours for small colour bar symbols, may be too small or blurred to be differentiated from each other. In such cases, the large colour barcode block is recognized by discriminating the colours of the wide colour bar symbols and the pitches between the wide colour bar symbols. Then, the position of the collimated portion can be determined. The colours are selected from the subtractive colour set, because the subtractive colours have the maximum degree of recognition in the colour space. After the initial positioning of the collimated portion with the estimated values for height "h" and distance "$d_1$" or "$d_2$", the microprocessor 24 will seek the exact value for height "h" of the collimated position and distance between the levelling rod 1 and the electronic level 2 in a refined search range through a cross-correlation evaluation between the detected image of barcode levelling rod 1 and the stored reference barcode in the ROM. The measurement results are displayed on the display 26. This data processing procedure is shown in the flow chart of FIG. 4.

The procedure begins with a pre-processing step S2 during which the image data is acquired and organized in digital form. This step is followed by a colour recognition step S4, in which the colour bar symbols of the collimated image are identified in terms of their elementary colours (magenta, cyan, yellow).

Next, the procedure seeks to determine (step S6) whether or not the collimated bar code block is a large barcode block 11 (cf. FIG. 2).

If the collimated image does not contain a large barcode block 11, then the procedure seeks to determine (step S8) whether it comprises a small barcode block 12, i.e. to determine whether it has an intelligible image signal for decoding a small barcode block. In the negative, the system determines that the levelling rod is out of target or range (step S10) and proceeds to a results display step (step S12) to indicate that situation.

If the collimated image comprises a determined barcode block, whether it is a large barcode block 11 from step S6, or a small barcode block 12 from step S8, the system proceeds to carry out an estimate of the position of the collimated portion, to determine the height measurement (step S14). The system then proceeds, if needs be, to a cross-correlation seek determination (step S16), as explained further below.

Since any one colour barcode block is different from any one colour barcode chosen from any other portion of the colour barcode scale on the erected or inverted levelling rod, whether the rod is erected or inverted can be automatically recognized by discriminating the permutation of the widths of bar symbols, and/or the pitches between the bar symbols, and/or the colours of bar symbols, at different measurement distance.

On the basis of the focal length f of the telescope objective and detected constant length $L_s$ for small colour barcode blocks, or the constant length $L_b$ for large colour barcode blocks, the distance between the levelling rod 1 and electronic level 2 can be estimated by the equation $$d_1 = f(L_s/m_1) \text{ or } d_2 = f(L_b/m_2) \qquad (2)$$

where $m_1$ and $m_2$ are the corresponding image lengths on the focal plane for the constant block length $L_s$ and $L_b$.

The invention claimed is:

1. Level determining apparatus specifically adapted for use with a leveling rod, the level determining apparatus comprising:
    imaging means for obtaining a colour image of a portion of said leveling rod located a distance therefrom; and
    processing means for identifying the position of said imaged portion along said leveling rod on the basis of colour information produced by said barcode symbols, the leveling rod comprising:
        position indications along the leveling rod expressed by barcode symbols; and
        wherein at least some of said barcode symbols are colour barcode symbols, the colour serving to encode said position indications; and
        wherein said barcode symbols are organized in first and second sets of blocks of barcode symbols disposed together in a single continuous row along the leveling rod, each set of blocks providing a position indication.

2. Level Determining Apparatus according to claim 1, wherein said barcode symbols are organized in the first and second blocks of barcode symbols, each providing a said position indication, wherein the length occupied along said rod by a said first block is smaller than the length occupied along said rod by a said second block, said first blocks thereby providing a finer position indication than said second blocks.

3. Level Determining Apparatus according to claim 2, wherein said first blocks of barcode symbols are formed of monochrome and colour barcode symbols.

4. Level Determining Apparatus according to claim 3, wherein said first blocks comprise just one colour barcode symbol and at least one monochrome barcode symbol.

5. Level Determining Apparatus according to claim 2, wherein said second blocks are formed purely of colour barcode symbols.

6. Level Determining Apparatus according to claim 5, wherein said colour barcode symbols forming said second blocks are colour barcode symbols which also serve to form said first blocks.

7. Level Determining Apparatus according to claim 2, wherein a said second block is formed by one colour barcode symbol from each of a plurality of first blocks.

8. Level Determining Apparatus according to claim 2, wherein said colour barcode symbols have a plurality of width values, and wherein said second blocks are formed only of colour barcode symbols having a relatively large width value.

9. Level Determining Apparatus according to claim 8, wherein any three consecutive colour barcode symbols having said relatively large width value constitute a said second block.

10. Level Determining Apparatus according to claim 2, wherein the pitch between consecutive said first blocks is constant.

11. Level Determining Apparatus according to claim 2, wherein each said second block is comprised of just three colour barcode symbols.

12. Level Determining Apparatus according to claim 2, wherein each second block has a unique colour sequence or permutation of colour barcode symbols.

13. Level Determining Apparatus according to claim 2, wherein any four adjacent barcode symbols constitute a said first block, said barcode symbols forming an uninterrupted sequence of barcode symbols along said leveling rod.

14. Level Determining Apparatus according to claim 2, wherein a said first block is comprised of three monochrome barcode symbols and one colour barcode symbol.

15. Level Determining Apparatus according to claim 1, wherein the colours of the colour barcode symbols are selected from the subtractive colour set: Magenta, Cyan, Yellow, or the colour set Red, Green, Blue, to enable the maximum degree of colour recognition.

16. Level Determining Apparatus according to claim 2, wherein barcode symbols are differentiated from each other by their colours and/or widths, and barcode blocks are differentiated from each other by their permutation of the colours of their bar symbols, the permutation of the width of bar symbols and the sequence of the pitches between their bar symbols.

17. Level Determining Apparatus according to claim 2, wherein the length of each first block is a constant value, and wherein the length of each said second block is of a larger constant value.

18. Level Determining Apparatus according to claim 2, wherein the pitches between the colour barcode symbols of a said second block are chosen from a set of integral multiples of the length of said first block, such that by virtue of the overlapping modulations of the pitches, the frequency lines appearing in a Fourier analysis of the combined pitches are enhanced.

19. Level Determining Apparatus according to claim 2, wherein the colour barcode symbol comprised in a said first block further provides and indication of the "begin" and the "end" of that block.

20. Level Determining Apparatus according to claim 1, wherein said colour barcode symbols have two possible width values.

21. Level Determining Apparatus according to claim 1, wherein adjacent said barcode symbols are separated by a selected pitch value from a set of four different fixed pitch values.

22. Level Determining Apparatus according to claim 1, wherein the width dimensions of the monochrome barcode symbols are chosen from a predetermined set of width values.

23. Level Determining Apparatus according to claim 1, wherein each first block has a unique sequence of barcode symbols in terms of colour, width and pitch between adjacent barcode symbols.

24. Level Determining Apparatus according to claim 2, wherein each said first block and/or second block defines a unique pattern with respect to a block at any other portion of the leveling rod or an inversion thereof, thereby providing an indication, detectable by said level determining apparatus, of whether said rod is normally positioned or positioned with a top-down inversion.

25. Level Determining Apparatus according to claim 1, wherein said first blocks are dimensioned so as to be discriminated by a said level determining apparatus located within and up to a predetermined distance, and wherein said second blocks are dimensioned so as to be discriminated by a said level determining apparatus located beyond said predetermined distance.

26. A method of use of the level determining apparatus according to claim 1 comprising obtaining a height information, wherein said leveling rod is positioned substantially in a vertical plane, whereby said relative positions of said bars express a height value.

27. Level determining apparatus according to claim 1, further comprising:
   imaging means for obtaining a colour image of a portion of said leveling rod located a distance therefrom; and
   processing means for identifying the position of said imaged portion along said leveling rod on the basis of colour information produced by said barcode symbols.

28. Level determining apparatus according to claim 27, wherein said processing means is operative to identify the position of the imaged portion selectively from a said first block or from a said second block within said imaged portion.

29. Level determining apparatus according to claim 27, wherein:
   said imaging means comprises a colour image sensor to receive the colour barcode image; and
   said processing means comprises:
      a symbol/pattern detection portion for detecting the colours, the pitches and an array bar symbol of the leveling rod;
      a memory portion for storing the sequence of colours of the bar symbols, the sequence of the widths of bar symbols and the corresponding sequence of the pitches between the bar symbols; and
      a computation portion for obtaining the position information of the collimated portion on the leveling rod, based on comparing a detected signal from the symbol detecting portion with the sequence of the bar symbols in the memory portion to identify a match.

30. Level determining apparatus according to claim 27, further comprising:
- means for storing the actual length, along said leveling rod of a first block and/or the actual length, along said leveling rod, of a second block;
- means for determining the length of the image of an imaged first block and/or the length of the image of an imaged second block;
- means for storing the value of the focal length of the optical system used to produce the imaged first and/or second blocks; and
- means for determining a distance of the imaged leveling rod from said level determining apparatus on the basis of said actual length value(s), said imaged lengths and said focal length.

31. Method of level determination adapted for use with the level determining apparatus according to claim 1, comprising the acts of:
- obtaining a colour image of a portion of said leveling rod; and
- identifying the relative position of said imaged portion along said leveling rod by reading the colour information therein expressed by an imaged first block or by an imaged second block.

32. Method according to claim 31, further comprising the acts of performing said identifying step selectively in accordance with a first mode in which said barcode information from an imaged first block is read, and a second mode in which said barcode information from an imaged second block is read, said read information being delivered as a reading, and of producing said reading in said first mode when said imaged first block is readable, and of producing said reading in said second mode when said imaged first block is unreadable.

33. Level determining apparatus comprising:
- a leveling rod including:
  - position indications along the leveling rod expressed by barcode symbols; and
  - wherein at least some of said barcode symbols are colour barcode symbols, the colour serving to encode said position indications; and
- means for operating selectively between a first mode in which said barcode information from an imaged first block is read, and a second mode in which said barcode information from an imaged second block is read, said read information being delivered as a reading; and
- wherein said means being operative to read said information in said first mode when said imaged first block is readable, and to read said information in said second mode when said imaged first block is unreadable.

34. Level determining apparatus specifically adapted for use with a leveling rod, the level determining apparatus comprising:
- imaging means for obtaining a colour image of a portion of said leveling rod located a distance therefrom; and
- processing means for identifying the position of said imaged portion along said leveling rod on the basis of colour information produced by said barcode symbols, the leveling rod comprising:
  - position indications along the leveling rod expressed by barcode symbols; and
    - wherein at least some of said barcode symbols are colour barcode symbols, the colour serving to encode said position indications; and
  - wherein said barcode symbols are organized in first and second sets of blocks of barcode symbols where the first set of blocks is disposed directly between two or more blocks of the second set of blocks, each set of blocks providing a position indication.

35. Level determining apparatus according to claim 34, wherein said barcode symbols are organized in the first and second sets of blocks of barcode symbols and are disposed together in a single continuous row along the leveling rod, each set of blocks providing a position indication.

36. Level determining apparatus according to claim 34, further comprising:
- means for operating selectively between a first mode in which said barcode information from an imaged first block is read, and a second mode in which said barcode information from an imaged second block is read, said read information being delivered as a reading; and
- wherein said means being operative to read said information in said first mode when said imaged first block is readable, and to read said information in said second mode when said imaged first block is unreadable.

* * * * *